(12) United States Patent
Biederman et al.

(10) Patent No.: US 7,363,525 B2
(45) Date of Patent: Apr. 22, 2008

(54) BIDIRECTIONAL INLINE POWER PORT

(75) Inventors: Daniel Biederman, San Jose, CA (US); Kenneth Coley, Campbell, CA (US); Frederick R. Schindler, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 395 days.

(21) Appl. No.: 10/961,864

(22) Filed: Oct. 7, 2004

(65) Prior Publication Data

US 2006/0089230 A1 Apr. 27, 2006

(51) Int. Cl.
*G06F 1/00* (2006.01)
*G06F 11/30* (2006.01)

(52) U.S. Cl. .................. 713/340; 713/330; 713/340; 709/230; 709/237; 714/4; 714/14; 714/15; 714/21

(58) Field of Classification Search ......... 713/300–340
See application file for complete search history.

(56) References Cited

U.S. PATENT DOCUMENTS

| | | | |
|---|---|---|---|
| 4,835,737 A | 5/1989 | Herrig et al. | |
| 5,122,691 A | 6/1992 | Balakrishnan | |
| 5,148,144 A | 9/1992 | Sutterlin et al. | |
| 5,237,511 A | 8/1993 | Caird et al. | |
| 5,268,592 A | 12/1993 | Bellamy et al. | |
| 5,289,359 A | 2/1994 | Ziermann | |
| 5,386,567 A | 1/1995 | Lien et al. | |
| 5,406,260 A | 4/1995 | Cummings et al. | |
| 5,461,671 A | 10/1995 | Sakuragi et al. | |
| 5,483,574 A | 1/1996 | Yuyama | |
| 5,491,804 A | 2/1996 | Heath et al. | |
| 5,531,612 A | 7/1996 | Goodall et al. | |
| 5,608,792 A | 3/1997 | Laidler | |
| 5,613,130 A | 3/1997 | Teng et al. | |
| 5,639,267 A | 6/1997 | Loudermilk | |
| 5,726,506 A | 3/1998 | Wood | |
| 5,742,513 A | 4/1998 | Bouhenguel et al. | |
| 5,758,102 A | 5/1998 | Carey et al. | |
| 5,775,946 A | 7/1998 | Briones | |
| 5,790,391 A | 8/1998 | Stich et al. | |
| 5,790,873 A | 8/1998 | Popper et al. | |
| 5,793,987 A | 8/1998 | Quackenbush et al. | |

(Continued)

FOREIGN PATENT DOCUMENTS

WO WO96/23377 8/1996

OTHER PUBLICATIONS

International Search Report for International Application No. PCT/US2005/036328, date of mailing Aug. 3, 2006.

(Continued)

*Primary Examiner*—James R. Trwillo
*Assistant Examiner*—James F. Sugent
(74) *Attorney, Agent, or Firm*—Thelen Reid Brown Raysman & Steiner LLP

(57) ABSTRACT

A method and apparatus for bidirectional provision of inline power over data telecommunications cabling permits power to be received at a local powered device (PD) from remote power sourcing equipment (PSE) via at least one conductor at a first time and power to be provided by the local device to the remote device or another device at a second different time.

12 Claims, 4 Drawing Sheets

U.S. PATENT DOCUMENTS

| | | | |
|---|---|---|---|
| 5,796,185 A | 8/1998 | Takata et al. | |
| 5,808,660 A | 9/1998 | Sekine et al. | |
| 5,809,256 A | 9/1998 | Najemy | |
| 5,834,925 A | 11/1998 | Chesavage | |
| 5,884,086 A | 3/1999 | Amoni et al. | |
| 5,884,233 A | 3/1999 | Brown | |
| 5,991,885 A | 11/1999 | Chang et al. | |
| 5,994,998 A | 11/1999 | Fisher et al. | |
| 6,033,266 A | 3/2000 | Long | |
| 6,036,547 A | 3/2000 | Belopolsky et al. | |
| 6,059,581 A | 5/2000 | Wu | |
| 6,068,520 A | 5/2000 | Winings et al. | |
| 6,099,349 A | 8/2000 | Boutros | |
| 6,115,468 A | 9/2000 | De Nicolo | |
| 6,134,666 A | 10/2000 | De Nicolo | |
| 6,162,089 A | 12/2000 | Costello et al. | |
| 6,218,930 B1 | 4/2001 | Katzenberg et al. | |
| 6,233,128 B1 | 5/2001 | Spencer et al. | |
| 6,310,781 B1 | 10/2001 | Karam | |
| 6,396,392 B1 | 5/2002 | Abraham | |
| 6,448,899 B1* | 9/2002 | Thompson | 340/815.4 |
| 6,496,105 B2 | 12/2002 | Fisher et al. | |
| 6,541,878 B1 | 4/2003 | Diab | |
| 6,701,443 B1 | 3/2004 | Bell | |
| 6,762,675 B1 | 7/2004 | Cafiero et al. | |
| 6,764,343 B2* | 7/2004 | Ferentz | 439/620.01 |
| 6,804,351 B1 | 10/2004 | Karam | |
| 6,958,699 B1 | 10/2005 | Karam | |
| 6,986,071 B2* | 1/2006 | Darshan et al. | 713/330 |
| 7,089,126 B2* | 8/2006 | Muir | 702/60 |
| 7,145,439 B2* | 12/2006 | Darshan et al. | 340/310.11 |
| 7,154,381 B2* | 12/2006 | Lang et al. | 340/310.11 |
| 7,159,129 B2* | 1/2007 | Pincu et al. | 713/300 |
| 7,162,377 B2* | 1/2007 | Amrod et al. | 702/60 |
| 2004/0049321 A1 | 3/2004 | Lehr et al. | |
| 2004/0073597 A1 | 4/2004 | Caveney et al. | |
| 2004/0146061 A1* | 7/2004 | Bisceglia et al. | 370/419 |
| 2004/0260794 A1* | 12/2004 | Ferentz et al. | 709/220 |
| 2005/0132240 A1* | 6/2005 | Stineman et al. | 713/300 |
| 2005/0197094 A1 | 9/2005 | Darshan et al. | |
| 2005/0257262 A1* | 11/2005 | Matityahu et al. | 726/22 |

OTHER PUBLICATIONS

Invitation to Pay Additional Fees (Partial International Search), Application No. PCT/US2005/036328, date of mailing May 26, 2006.

Mendelson, G., White Paper "All You Need to Know About Power Over Ethernet (PoE) and the IEEE 802.3af Standard", pp. 1-24, Jun. 2004.

"IEEE Standard 802.3af™", IEEE Standard for Information Technology-Telecommunications and Information Exchange Between Systems-Local and Metropolitan Area Networks-Specific Requirement, IEEE The Institute of Electrical and Electronics Engineering, Inc., Jun. 18, 2003.

"3Com® NJ100 Network Jack Power", printed from http://www.poweroverthenet.com/manual/content/view/full/776/, 3Com, Tuesday, Mar. 18, 2003.

3Com User Guide-3Com IntelliJack, Model NJ220, Version 1.0, 3Com, Nov. 2003.

International Search Report for International Application No. PCT/US2005/036392, date of mailing Mar. 10, 2006.

"3Com User Guide," 3Com Network Jack, Model NJ200, Version 1.0, 3Com, Sep. 2002.

International Search Report for International Application No. PCT/US2005/036329, date of mailing Sep. 4, 2006.

International Perliminary Report on Patentability Application No. PCT/US2005/036328, date of mailing May 18, 2007.

Lynn, K., "Universal Serial Bus (USB) Power Management," Wescon Conference, IEEE, Sep. 1998, pp. 194-204.

* cited by examiner

BIDIRECTIONAL INLINE POWER PORT

STATEMENT OF RELATED CASES

This patent may be considered to be related to commonly owned U.S. patent application Ser. No. 10/961,243 filed on Oct. 7, 2004 and entitled "Redundant Power and Data Over A Wired Data Telecommunications Network" in the names of inventors Daniel Biederman, Kenneth Coley and Frederick R. Schindler.

This patent may be considered to be related to commonly owned U.S. patent application Ser. No. 10/961,904 filed on Oct. 7, 2004 and entitled "Inline Power-Based Common Mode Communication in a Wired Data Telecommunications Network" in the names of inventors Roger A. Karam, Frederick R. Schindler and Wael William Diab.

This patent may be considered to be related to commonly owned U.S. patent application Ser. No. 10/961,865 filed on Oct. 7, 2004 and entitled "Automatic System for Power and Data Redundancy in a Wired Data Telecommunications Network" in the names of inventors Roger A. Karam and Luca Cafiero.

This patent may be considered to be related to commonly owned U.S. patent application Ser. No. 10/982,383 filed on Nov. 5, 2004 and entitled "Power Management for Serial-Powered Device Connectons" in the name of inventor Roger A. Karam.

This patent may be considered to be related to commonly owned U.S. patent application Ser. No. 11/022,266 filed on Dec. 23, 2004 and entitled "Redundant Power and Data In A Wired Data Telecommunications Network" in the names of inventors Roger A. Karam and Luca Cafiero.

This patent may be considered to be related to commonly owned U.S. patent application Ser. No. 11/000,734 filed on Nov. 30, 2004 and entitled "Power and Data Redundancy in a Single Wiring Closet" in the names of inventors Roger A. Karam and Luca Cafiero.

This patent may be considered to be related to commonly owned U.S. patent application Ser. No. 10/981,203 filed on Nov. 3, 2004 and entitled "Powered Device Classification in a Wired Data Telecommunications Network" in the name of inventor Roger A. Karam and John F. Wakerly.

This patent may be considered to be related to commonly owned U.S. patent application Ser. No. 10/981,202 filed on Nov. 3, 2004 and entitled "Current Imbalance Compensation for Magnetics in a Wired Data Telecommunications Network" in the names of inventors Roger A. Karam and John F. Wakerly.

This patent may be considered to be related to commonly owned U.S. patent application Ser. No. 10/845,021 filed May 13, 2004 and entitled "Power Delivery over Ethernet Cables" in the names of inventors Wael William Diab and Frederick R. Schindler.

This patent may be considered to be related to commonly owned U.S. Pat. No. 6,541,878 entitled "Integrated RJ-45 Magnetics with Phantom Power Provision" in the name of inventor Wael William Diab.

This patent may be considered to be related to commonly owned U.S. patent application Ser. No. 10/850,205 filed May 20, 2004 and entitled "Methods and Apparatus for Provisioning Phantom Power to Remote Devices" in the name of inventors Wael William Diab and Frederick R. Schindler.

FIELD OF THE INVENTION

The present invention relates generally to networking equipment which is powered by and/or powers other networking equipment over wired data telecommunications network connections.

BACKGROUND OF THE INVENTION

Inline Power (also known as Power over Ethernet and PoE) is a technology for providing electrical power over a wired data telecommunications network (such as, for example, the well-known Ethernet) from power source equipment (PSE) to a powered device (PD) over a link section. The power may be injected by an endpoint PSE at one end of the link section or by a midspan PSE along a midspan of a link section that is distinctly separate from and between the media dependent interfaces (MDIs) to which the ends of the link section are electrically and physically coupled.

PoE is defined in the IEEE (The Institute of Electrical and Electronics Engineers, Inc.) Standard Std 802.3af-2003 published 18 Jun. 2003 and entitled "IEEE Standard for Information technology—Telecommunications and information exchange between systems—Local and metropolitan area networks—Specific requirements: Part 3 Carrier Sense Multiple Access with Collision Detection (CSMA/CD) Access Method and Physical Layer Specifications: Amendment: Data Terminal Equipment (DTE) Power via Media Dependent Interface (MDI)" (herein referred to as the "IEEE 802.3af standard"). The IEEE 802.3af standard is a globally applicable standard for combining the transmission and reception (collectively: "transceiving") of Ethernet packets with the transmission and reception of DC-based power over the same set of wires in a single Ethernet cable. It is contemplated that Inline Power will power such PDs as Internet Protocol (IP) telephones, surveillance cameras, switching and hub equipment for the telecommunications network, biomedical sensor equipment used for identification purposes, other biomedical equipment, radio frequency identification (RFID) card and tag readers, security card readers, various types of sensors and data acquisition equipment, fire and life-safety equipment in buildings, and the like. The power is direct current, floating 48 Volt power currently available at a range of power levels from about 4 watts to about 15 watts in accordance with the standard. There are mechanisms within the IEEE 802.3af standard to allocate a requested amount of power. Other proprietary schemes also exist to provide a finer and more sophisticated allocation of power than that provided by the IEEE 802.3af standard while still providing basic compliance with the standard. As the standard evolves, additional power may also become available. Conventional 8-conductor type RG-45 connectors (male or female, as appropriate) are typically used on both ends of all Ethernet connections. They are wired as defined in the IEEE 802.3af standard.

FIGS. 1A, 1B and 1C are electrical schematic diagrams of three different variants of PoE as contemplated by the IEEE 802.3af standard. In FIG. 1A a data telecommunications network 10a comprises a switch or hub 12a with integral power sourcing equipment (PSE) 14a. Power from the PSE 14a is injected on the two data carrying Ethernet twisted pairs 16aa and 16ab via center-tapped transformers 18aa and 18ab. Non-data carrying Ethernet twisted pairs 16ac and 16ad are unused in this variant. The power from data carrying Ethernet twisted pairs 16aa and 16ab is conducted from center-tapped transformers 20aa and 20ab to powered device (PD) 22a for use thereby as shown. In FIG. 1B a data telecommunications network 10b comprises a switch or hub 12b with integral power sourcing equipment (PSE) 14b. Power from the PSE 14b is injected on the two non-data carrying Ethernet twisted pairs 16bc and 16bd. Data carrying Ethernet twisted pairs 16ba and 16bb are unused in this variant for power transfer. The power from non-data carrying Ethernet twisted pairs 16bc and 16bd is conducted to powered device (PD) 22b for use thereby as shown. In FIG. 1C a data telecommunications network 10c comprises a switch or hub 12c without integral power sourcing equipment (PSE). Midspan power insertion equipment 24 simply passes the data signals on the two data carrying Ethernet twisted pairs 16ca-1 and 16cb-1 to corresponding data carrying Ethernet twisted pairs 16ca-2 and 16cb-2. Power from the PSE 14c located in the Midspan power insertion equipment 24 is injected on the two non-data carrying Ethernet twisted pairs 16cc-2 and 16cd-2 as shown. The power from non-data carrying Ethernet twisted pairs 16cc-2 and 16cd-2 is conducted to powered device (PD) 22c for use thereby as shown. Note that powered end stations 26a, 26b and 26c are all the same so that they can achieve compatibility with each of the previously described variants.

Inline Power is also available through techniques that are non-IEEE 802.3 standard compliant as is well known to those of ordinary skill in the art.

In many cases where PDs are used, it may be desirable to provide some redundancy in terms of data and/or power delivery for cases in which equipment (hubs, switches, cable and the like) providing the power and/or data fails to continue to do so.

SUMMARY OF THE INVENTION

A method and apparatus for bidirectional provision of inline power over data telecommunications cabling permits power to be received at a local powered device (PD) from remote power sourcing equipment (PSE) via at least one conductor at a first time and power to be provided by the local device to the remote device or another device at a second different time.

Other aspects of the inventions are described and claimed below, and a further understanding of the nature and advantages of the inventions may be realized by reference to the remaining portions of the specification and the attached drawings.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1A:
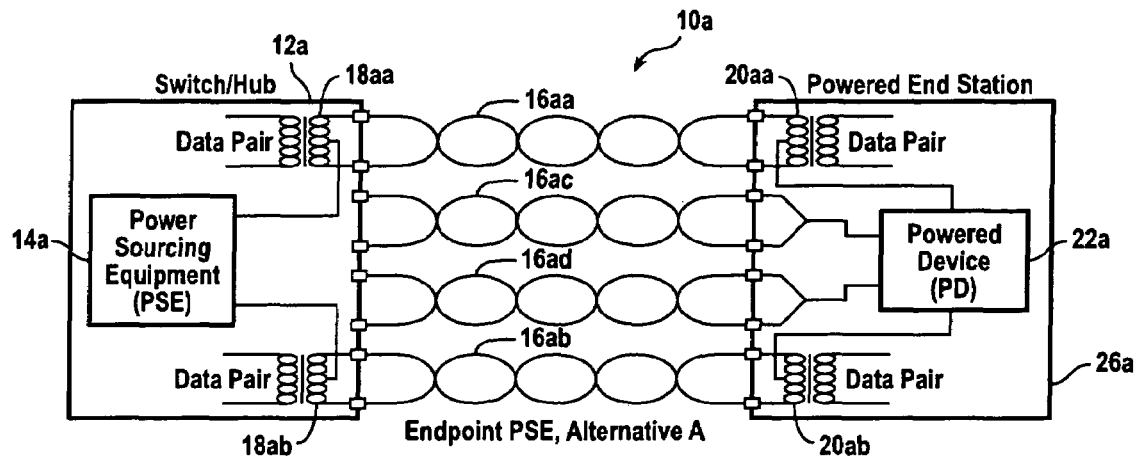
FIGS. 1A, 1B and 1C are electrical schematic diagrams of portions of data telecommunications networks in accordance with the prior art.
Figure 1B:
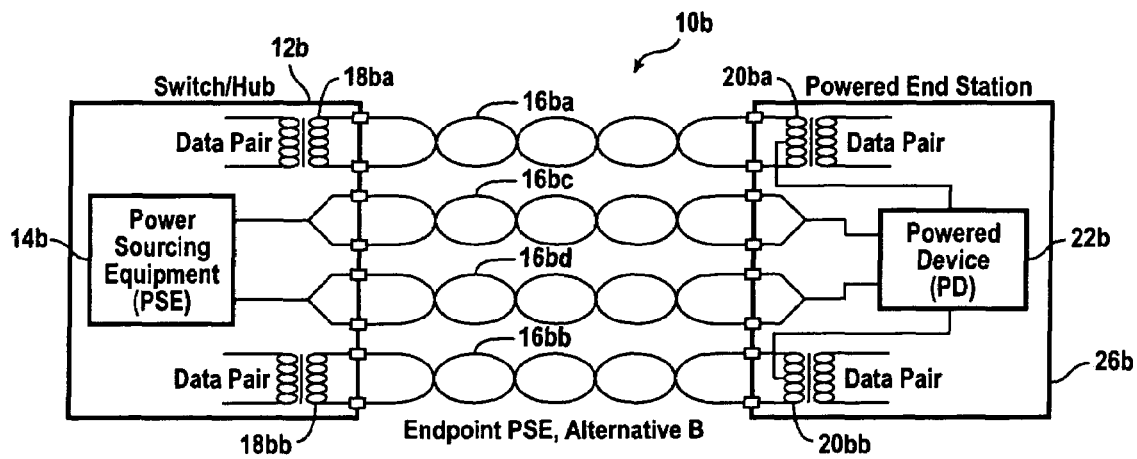
Figure 1C:
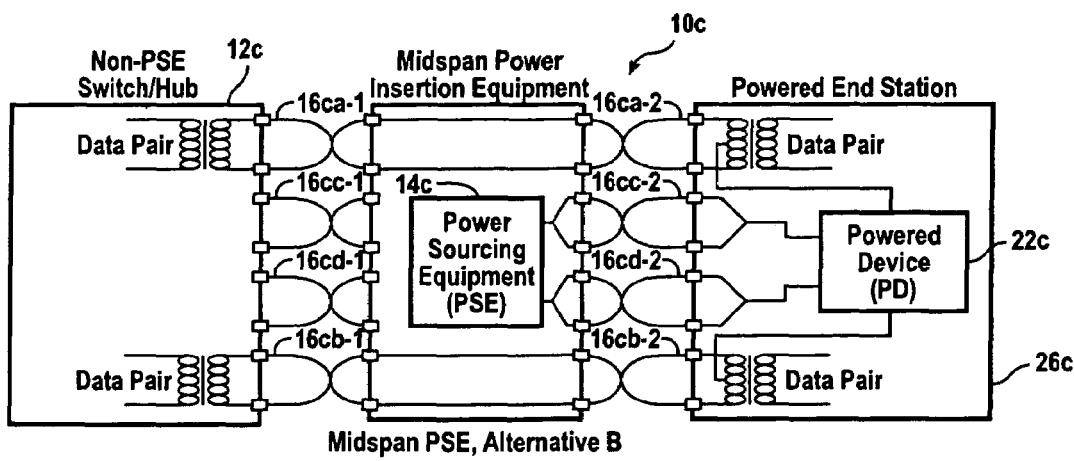

Embodiments of the present invention described in the following detailed description are directed at bidirectional inline power. Those of ordinary skill in the art will realize that the detailed description is illustrative only and is not intended to restrict the scope of the claimed inventions in any way. Other embodiments of the present invention, beyond those embodiments described in the detailed description, will readily suggest themselves to those of ordinary skill in the art having the benefit of this disclosure. Reference will now be made in detail to implementations of the present invention as illustrated in the accompanying drawings. Where appropriate, the same reference indicators will be used throughout the drawings and the following detailed description to refer to the same or similar parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with embodiments of the present invention, a networked device may have a data telecommunications port which may operate as a powered device (PD) under certain circumstances, may be off for power purposes under other circumstances and may operate as power sourcing equipment (PSE) under yet other circumstances. The same port may be a PD at one time and PSE at another time, and, if desired, off at yet another time.

Examples of applications where this invention may be used are a portable computing device such as laptop computer, personal data assistant (PDA), smart phone or similar device which may or may not be attached to an independent power supply (or may be configured to only receive power over a network connection). When the portable computing device is not connected to its own power supply it may have a data telecommunications port (such as an Ethernet port having a type RG-45 connector) configured to act as a PD and thereby receive power over a network connection with, for example, a network switch port configured as PSE. In this way the laptop may receive some power to charge its battery, or at least extend the amount of time it may be used before its power is exhausted (where it draws more power than can be delivered over the inline power connection to the PSE). At other times the portable computing device may act as PSE to provide power back to the network (as in an emergency situation or as part of a power back-up system) or, for example, to another device coupled to the portable computing device such as a cell phone, smart phone, PDA or the like. In such a case the connected device could be connected to the portable computing device via Ethernet or some other wired data telecommunications protocol as will now be understood by those of ordinary skill in the art. Those of ordinary skill in the art will now also realize that these examples given here are merely examples and are not intended to limit the applicability of the present invention in any way and that the present invention has broad applicability to virtually all wired data telecommunications ports, particularly Ethernet ports.

Figure 2:
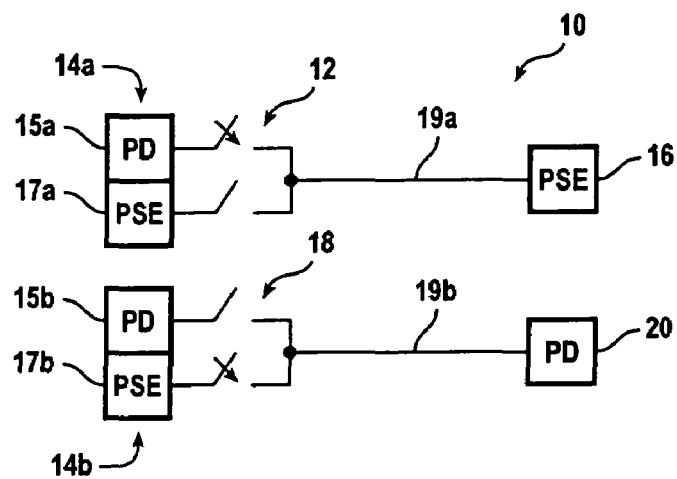
FIG. 2 is a block diagram showing a simplified view of a pair of configurations of media dependent interfaces (MDIs) for all connected devices and the cable connecting them in a data communications network segment in accordance with an embodiment of the present invention.

FIG. 2 is a block diagram showing a simplified view 10 of a pair of configurations of media dependent interfaces (MDIs) for all connected devices and the cable connecting them in a data communications network segment in accordance with an embodiment of the present invention. A first configuration 12 illustrates a shared MDI 14a having a switched PD functional block 15a shown in an on state and a switched PSE functional block 17a shown in an off state. These are coupled via cable 19a to a MDI 16 of a remote device configured as PSE. Alternately a second configuration 18 illustrates a shared MDI 14b having a switched PD functional block 15b shown in an off state and a switched PSE functional block 17b shown in an on state. These are coupled via cable 19b to a MDI 20 of a remote device configured as a PD. While typical use of this approach will be with conventional four-wire-pair Ethernet cable, for power transmission, all that is required is a cable over which power may be transmitted. This includes a single conductor with a power signal referenced to ground, or more conductors, as desired in a particular application. Note also that it is conceivable that a situation might arise in some context where it would be desirable for a port to, in effect, power itself and have the two states PD and PSE simultaneously active; similarly it might be desirable to have both the PD and PSE functional blocks switched to off so that the power functions of a port are off. These situations are intended to be within the scope of this disclosure and the appended claims.

Accordingly, a bidirectional inline power port at a fixed location or associated with a portable computing device may be configured to source power (PSE mode) or sink power (PD mode) depending upon the conditions presented. For example, a portable computing device at home, at work or onboard a transportation vehicle with an available PSE port may configure itself to operate in PD mode so as to charge its battery or obtain power for other purposes. When disconnected, the portable computing device may respond to a request for power from another attached PD and thereby change a configuration of its data telecommunications port from PD to PSE in order to provide power to the attached PD (such as a telephone, cell phone, PDA, or the like).

Figure 3:
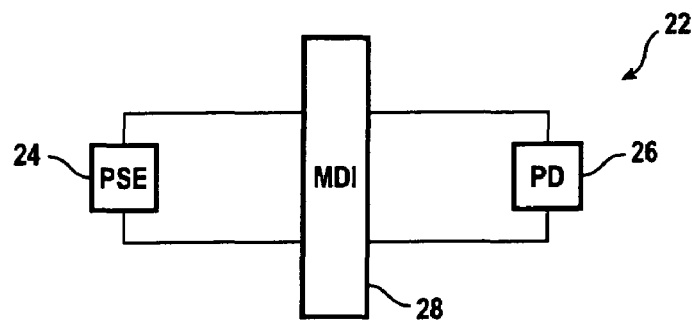
FIG. 3 is a block diagram illustrating a simplified design for a bidirectional inline power port in accordance with an embodiment of the present invention.

FIG. 3 is a block diagram illustrating a simplified design for a bidirectional inline power port 22 in accordance with an embodiment of the present invention which includes a PSE block 24, a PD block 26 and an MDI (media dependent interface) 28 such as a conventional Ethernet interface for coupling to data telecommunications network cabling. A single or a multiple MDI (using separate electrical connections) may be provided, as desired.

Figure 4:
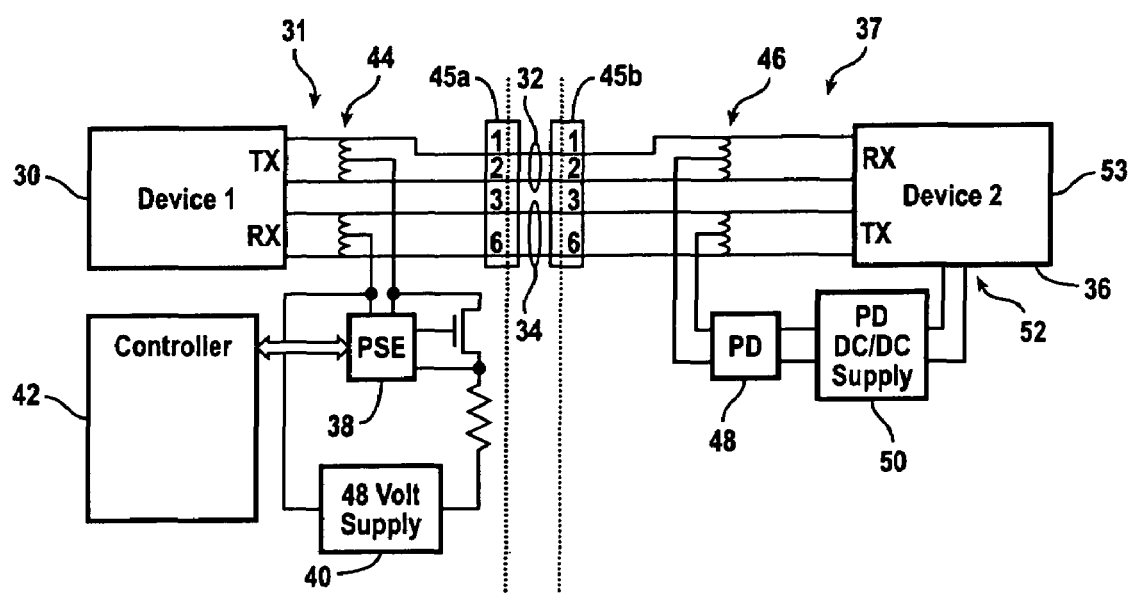
FIG. 4 is an electrical schematic diagram of a conventional inline power over Ethernet cabling set-up.

FIG. 4 is an electrical schematic diagram of a conventional inline power over Ethernet cabling set-up. In the FIG. 4 configuration, a first functional block 30 representing the data portion of a port of a first network device is coupled to first MDI 45a, and from first MDI 45a over (in this instance) two pairs of wires 32 and 34 to a second MDI 45b, and from there to a second functional block 36 representing the data portion of a port of a second network device. In this example the power portion of the first port (collectively 31) is always the PSE and the power portion of the second port (collectively 37) is always PD. PSE interface 38 is provided with an appropriate power supply 40 and operates under the control of controller 42. Controller 42, power supply 40 and PSE interface 38 are coupled to first MDI 45a over conventional IEEE 802.3af coupling 44 as shown. At second port 37 conventional IEEE 802.3af coupling is provided to couple the power from the second MDI 45b to a power portion of port 37 including a PD block 48 where the power is received and transmitted, if necessary, to a DC/DC power supply 50, and from there to a power input 52 for the second network device 53. Note that while controller 42 is shown closely associated with the port, that it need not be so, and the controller may be at some distance from, but coupled to the port over the wired data telecommunications network, or in some other conventional fashion, or the controller may comprise multiple parts, some of which are physically close to or a part of the port and some of which are physically remote therefrom, as at a switch, router, server, network control point, or the like.

Figure 5:
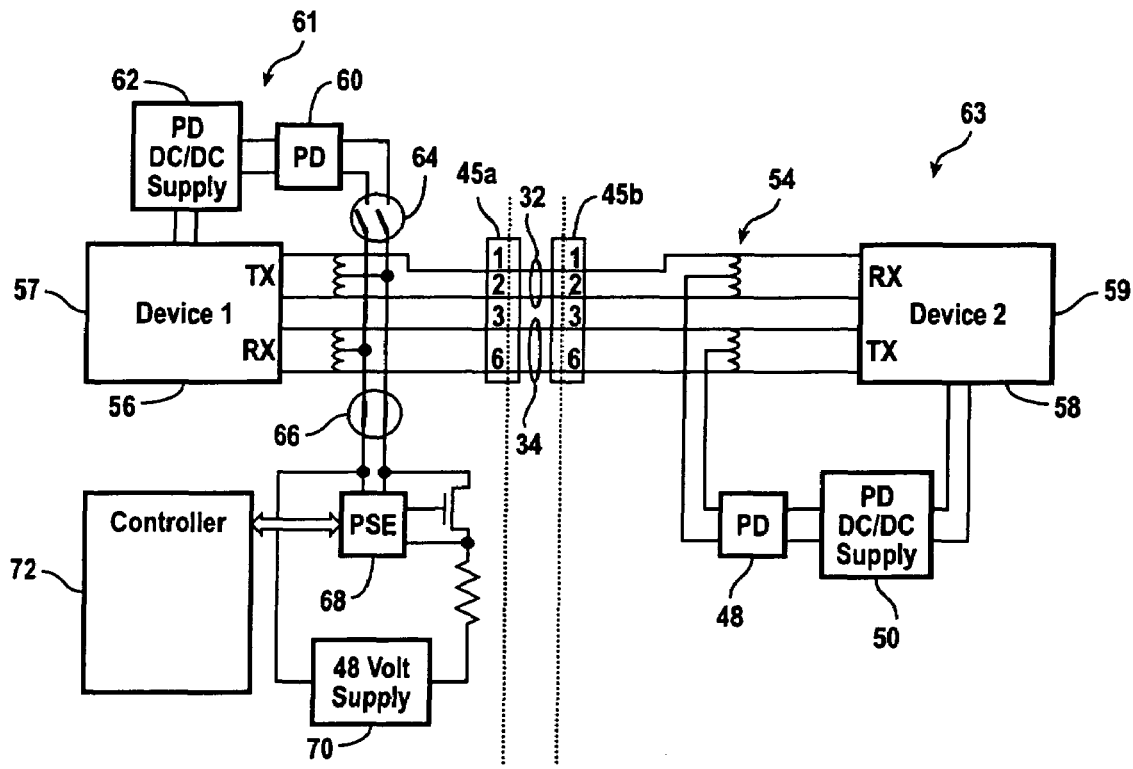
FIG. 5 is an electrical schematic diagram of a bidirectional inline power port configuration in accordance with an embodiment of the present invention.

FIG. 5 is an electrical schematic diagram of a bidirectional inline power port configuration 54 in accordance with an embodiment of the present invention. In this embodiment a first functional block 56 representing the data portion of a port 61 of a first network device 57 is coupled to first MDI 45a, and from first MDI 45a over (in this instance) two pairs of wires 32 and 34 to a second MDI 45b, and from there to a second functional block 58 representing the data portion of a port 63 of a second network device 59. In this instance port 61 may be configured as PD or PSE and port 63 may be configured as PD just as port 37 in FIG. 4. Port 61 includes a PD block 60 and a DC/DC converter block 62 just like port 37 of FIG. 4. In this case, however, switches (or other equivalent switching equipment such as diodes, transistors, relays and the like as will now be apparent to those of ordinary skill in the art) are provided to enable either the PD or the PSE (or neither or both) modes at port 61. Switching circuitry 64 selectively couples PD block 60 to first MDI 45a. Similarly, switching circuitry 66 selectively couples PSE block 68 (and power supply block 70) under control of controller 72 to first MDI 45a. Controller 72 or another controller (see discussion above) may monitor conditions such as a state of charge of a battery or availability of power received through PD block 60, or the like, to determine the state of switching circuitry 64 and 66 and hence the mode of operation of port 61. It is also possible and within the inventive concepts herein described to control the state of switching circuitry 64 and 66 directly in a conventional manner such as switches, hubs and the like are managed, e.g., by commands transmitted over the data communications network from a command center.

Figure 6:
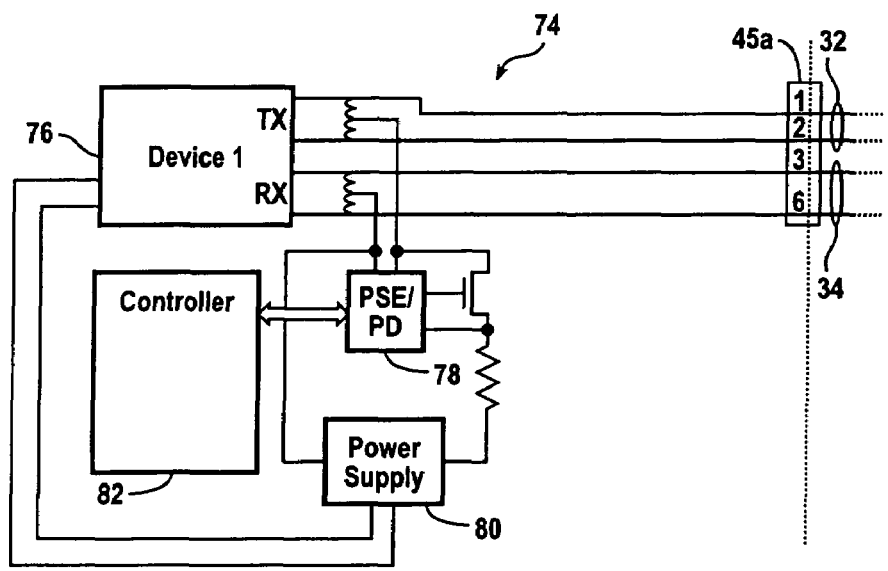
FIG. 6 is an electrical schematic diagram of a configuration of a bidirectional inline power port in accordance with an embodiment of the present invention.

FIG. 6 is an electrical schematic diagram of a configuration 74 of a bidirectional inline power port in which a port 76 of a first device is shown coupled for communication over cable pairs 32 and 34. An integrated PSE/PD block 78 coupled to receive power (when available) from power supply block 80 (which may be a conventional grid-powered or battery-powered power supply). Controller 82 controls operation of PSE/PD block 78 in response to monitored (or commanded) conditions as discussed above. In a first mode PSE/PD block 78 operates as a PSE. In a second mode PSE/PD block 78 operates as a PD. In a third optional mode PSE/PD block 78 may be turned off so that no inline power is passed and in a fourth optional mode PSE/PD block 78 may be set to be both PSE and PD.

Figure 7:
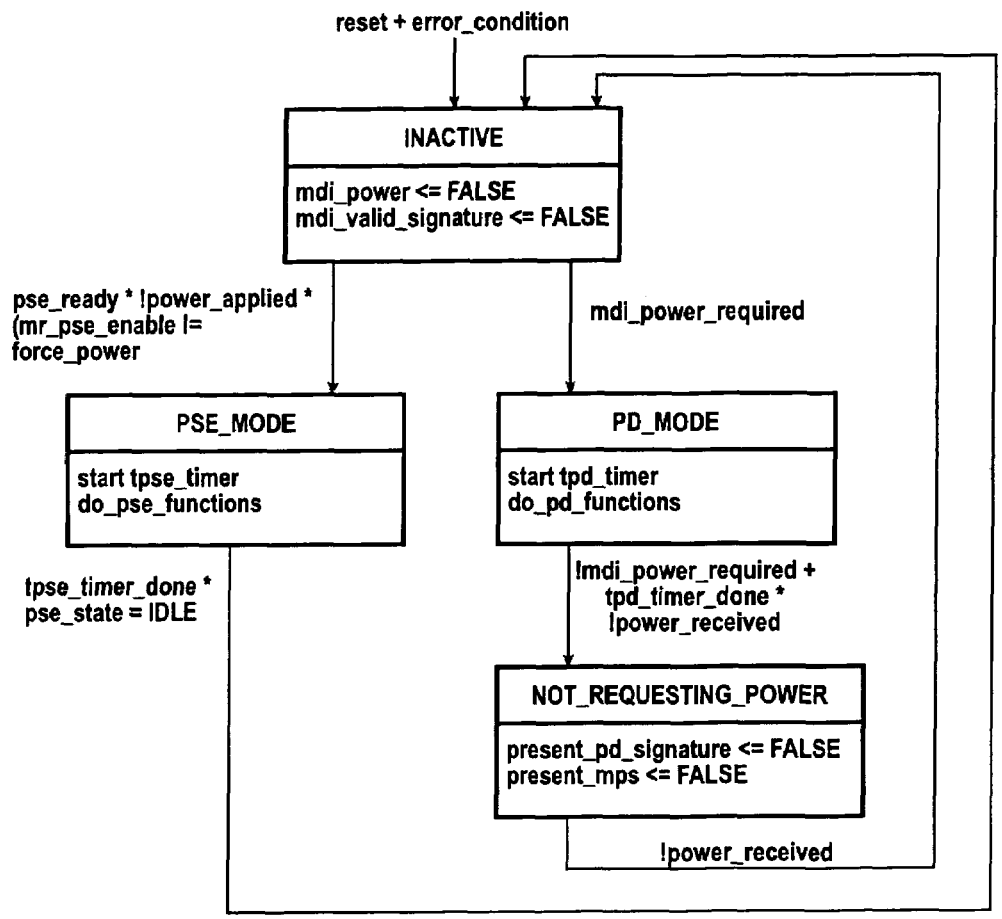
FIG. 7 is a flow diagram illustrating operation of the bidirectional inline power port in deciding which mode of operation to assert in accordance with an embodiment of the present invention.

FIG. 7 is a flow diagram illustrating operation of the bidirectional inline power port in deciding which mode of operation to assert. This program of instructions is executable by a machine and is illustrated in conventional pseudo-code similar to that used, for example, in the specification for IEEE 802.3af referred to above. It may now easily be implemented by those of ordinary skill in the art having the benefit of this disclosure in either hardware, software or firmware. In FIG. 7 the state PSE_MODE contains the IEEE 802.3af state machine for a PSE. The state PD_MODE contains the IEEE 802.3af state machine for a PD, with the state NOT_REQUESTING_POWER pulled out to show in this FIG. 7. The state is pulled out so that a new condition may be added (tpd_timer_done).

Within the INACTIVE state the system determines the needs for: PD, PSE, none and (if desired) PSE+PD operation. (While the PSE+PD mode of operation (switches 64 and 66 closed) represents a mode where the interface is, in effect, supplying power to itself and is an unlikely occurrence, it is still possible and might be desirable under certain circumstances and is thus described herein—in such a case it is desirable to provide switches which may be opened when appropriate to prevent power from being inserted onto the cable pairs—these could be located at the center-taps of the coupling transformers (not shown in FIG. 5)—or a separate path from the PSE to the PD—so that the cable does not have power on it when a remote device has not requested it). If power can be supplied by the device, the path to PSE_MODE is traversed. If power is required, then the path to PD_MODE is traversed. A different timer is used in each path to exit the path when the timer expires and no progress has been made entering the mode of operation attempted. This results in the INACTIVE state being entered where system needs are checked and prioritized before one of the modes is attempted again. The system is capable of manipulating the IEEE 802.3af variables to change the behavior of the IEEE 802.3af state machines.

The state of the port may also be managed by direct commands transmitted over the wired data communications network (or by other conventional means such as wireless) as from a conventional graphical user interface (GUI) or a command line interface (CLI) as are conventionally used to manage components of data communications networks. It is also possible to configure software to manage the state decision in response to various conditions as will now be apparent to those of ordinary skill in the art. It should be noted that the power requirements of a PD may change from time to time depending upon how it is used, or other time dependent operation of the device. As a result, it would be desirable to adjust the power delivered to the PD from time to time to meet these new requirements, either by increasing the power delivered or decreasing it, as appropriate. A number of mechanisms are provided by the present invention to accomplish this. First, the controller may direct a PSE block (see, e.g., FIG. 5) to reenter the INACTIVE state periodically to thereby reassess power demands and allocate power accordingly. Second, low bandwidth data communications may be established between a PSE and an attached PD so that the PD may communicate directly to the PSE its instantaneous power demands and the PSE may respond accordingly. Those of ordinary skill in the art will now realize that a number of known communications mechanisms may be used to modulate a data communication signal over the connecting cable, through the respective MDIs and between the PD and PSE without disrupting existing communications over the link. For example, a pulse-type communications signal could be transmitted between the PD and PSE to communicate current power requirements of the PD and/or power availability at the PSE to the PD. Third, in a similar fashion, the PD and PSE may establish communications over the data communications network to a control center, master controller or the like and tell it their respective power availabilities and power needs. In response the controller may command adjustments in provided power and/or desired power to the PSE or PD, respectively. Those of ordinary skill in the art will now realize that other equivalent mechanisms are available to periodically revise the amount of power made available by the PSE to the PD.

Figure 8A:
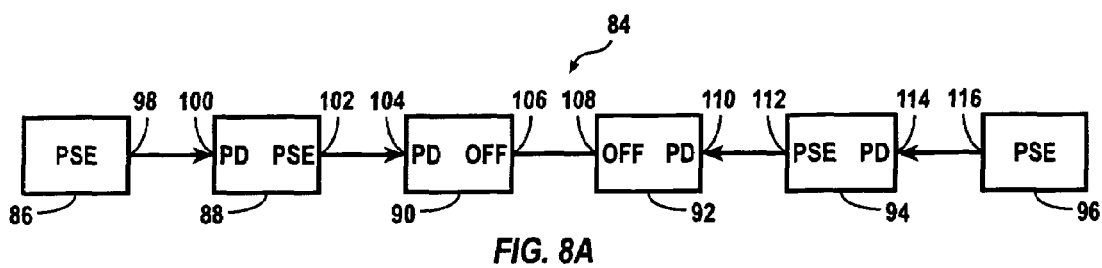
FIGS. 8A and 8B are block diagrams of a portion of a data telecommunications network configured and operating in accordance with an embodiment of the present invention.

Turning now to FIG. 8A, FIG. 8A is a block diagram of a portion 84 of a data communications network comprising a number of network devices 86, 88, 90, 92, 94 and 96. Each of the network devices has at least one port for carrying out data telecommunications and/or inline power transmission. Device 86 has at least first port 98. Device 88 has at least second and third ports 100 and 102. Device 90 has at least fourth and fifth ports 104 and 106. Device 92 has at least sixth and seventh ports 108 and 110. Device 94 has at least eighth and ninth ports 112 and 114 and device 96 has at least tenth port 116. Note that at least network devices 86 and 96 could be the same device and/or may have uplink(s) to another network such as an intranet, the internet, and the like.

This data communications network is configured so that there is redundant data and redundant inline power available so that the normal effects (e.g., data interruption, power interruption) of a cut in the cabling coupling the devices together may be avoided. In FIG. 8A port 98 of device 86 is configured PSE and feeds power and communicated data with port 100 of device 88. Device 88 provides internal coupling of data to port 102. Port 100 is configured as PD to receive power from port 98 and port 102 is configured PSE to provide power to PD-configured port 104 of device 90. Port 106 of device 90 is configured so that inline power is off (but data may be communicated) as is port 108 of device 92. The rest of the ports are similarly configured as indicated in FIG. 8A.

Figure 8B:
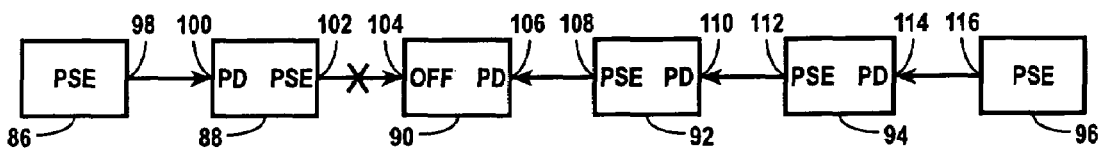

Turning now to FIG. 8B we see that the cabling has been cut or disrupted in some fashion between port 102 and port 104. In this case, since port 104 can no longer receive inline power from port 102, it has been reconfigured so that inline power is off. (Note that the PD/PSE functions of ports may be configured as required by the controller. For example, in this case port 102 might not be set to off if it still required power from a PSE and it was configured to "look" like a PD.) Port 106 which had been off in FIG. 8A is now reconfigured to receive power in PD mode. Port 108 which had been off is now reconfigured in response to the demand from port 106 in PD mode so that it is now in PSE mode. The balance of the network inline power ports remain unchanged. In this manner a single severed network connection will not necessarily result in inline powered equipment being forced to shut down. Similarly, the Ethernet connections may still reach all connected network devices and conventional network protocols such as the well-known Spanning Tree Protocol (STP) and the like will adapt the network to the new cabling configuration.

It is also within the scope of this invention to provide bidirectional midspan power, e.g., a power injector which may act as PSE to either an "upstream" or "downstream"

device but not necessarily carrying out any data operations. This would be useful, for example, in long cable runs where power losses in the cable become significant. Such an arrangement would also be useful to provide backup sources of power to a network at locations where power happens to be available, such as generator-supplied power or emergency power, or the like. Similarly, it is possible to provide power storage devices, such as batteries or large capacitors, or the like, on board a network device or power injector. Acting as a PD the power storage device may be charged by the power available on the network (or it may be charged locally by connection to another power source). When another device communicates a desire to act as a PD, the power storage device may switch modes to PSE to provide power to the other device. This approach also allows a device with a first average power requirement and a second, higher, low duty cycle power requirement to classify itself with the first lower power requirement (avoiding locking up mostly unneeded system power resources) while making up the peak power requirement with a power storage device located in the device or some other device which can act as a PSE to the device for this purpose.

It should be noted that while certain circuitry has been shown in the configurations of the PSE/PD ports, any circuitry suitable to carry out the functions specified may be used and the implementation of such circuitry in any number of various forms is well within the skill of those of ordinary skill in the art having the benefit of this disclosure.

While embodiments and applications of this invention have been shown and described, it will now be apparent to those skilled in the art having the benefit of this disclosure that many more modifications than mentioned above are possible without departing from the inventive concepts disclosed herein. Therefore, the appended claims are intended to encompass within their scope all such modifications as are within the true spirit and scope of this invention.

What is claimed is:

1. A data telecommunications network, comprising:
    a first device having a first port configured as power sourcing equipment (PSE);
    a second device having a second port coupled to said first port, and a third port, the second port configured as a powered device (PD) and the third port configured as PSE, the second and the third port coupled within the second device to communicate data;
    a third device having a fourth port coupled to said third port, and a fifth port, the fourth port configured at a first time as a PD and the fifth port configured at the first time with inline power turned off, the fourth port and the fifth port coupled within the third device to communicate data;
    a fourth device having a sixth port coupled to said fifth port, and a seventh port, the sixth port configured at the first time with inline power turned off, the sixth port and the seventh port coupled within the fourth device to communicate data; and
    circuitry for detecting a loss of power at a second time delivered from said third port to said fourth port, said fourth port adapted to turn off inline power responsive to said circuitry, said fifth port adapted to be configured as a PD responsive to said circuitry, and said sixth port adapted to turn on inline power and configure itself as PSE in response to said fifth port becoming configured as a PD.

2. The data telecommunications network of claim 1 wherein the second device, third device, and fourth device are respectively coupled to the first port, third port, and fifth port via a multi-conductor cable.

3. The data telecommunications network of claim 2 wherein the multi-conductor cable is an Ethernet cable.

4. The data telecommunications network of claim 1 wherein at least one of the first device, second device, third device, and fourth device are selected from the group consisting of portable computing device, telecommunications device, and rechargeable power store.

5. The data telecommunications network of claim 4 wherein the first device, second device, third device, and fourth device include a rechargeable power store and a chargeable device and wherein the rechargeable power store is charged when the chargeable device has surplus power.

6. The data telecommunications network of claim 5 wherein the rechargeable power store provides power to the chargeable device when the chargeable device requires power.

7. A method of operation for a data telecommunications network having a first device having a first port configured as power sourcing equipment (PSE), a second device having a second port coupled to said first port, and a third port, the second port configured as a powered device (PD) and the third port configured as PSE, the second and the third port coupled within the second device to communicate data, a third device having a fourth port coupled to said third port, and a fifth port, the fourth port configured at a first time as a PD and the fifth port configured at the first time with inline power turned off, the fourth port and the fifth port coupled within the third device to communicate data, and a fourth device having a sixth port coupled to said fifth port, and a seventh port, the sixth port configured at the first time with inline power turned off, and the sixth port and the seventh port coupled within the fourth device to communicate data, said method comprising:
    detecting a loss of power at a second time delivered from the third port to the fourth port;
    turning off inline power at the fourth port in response to said detecting;
    configuring the fifth port as a PD in response to said detecting;
    turning on inline power at the sixth port and configuring the sixth port as PSE in response to the fifth port becoming configured as a PD.

8. The method of claim 7 wherein the second device, third device, and fourth device are respectively coupled to the first port, third port, and fifth port via a multi-conductor cable.

9. The method of claim 8 wherein the multi-conductor cable is an Ethernet cable.

10. The method of claim 7 wherein at least one of the first device, second device, third device, and fourth device are selected from the group consisting of portable computing device, telecommunications device, and rechargeable power store.

11. The method of claim 10 wherein the first device, second device, third device, and fourth device include a rechargeable power store and a chargeable device and wherein the rechargeable power store is charged when the chargeable device has surplus power.

12. The method of claim 11 wherein the rechargeable power store provides power to the chargeable device when the chargeable device requires power.

* * * * *